Patented Jan. 19, 1954

2,666,743

UNITED STATES PATENT OFFICE 2,666,743

LUBRICATING COMPOSITIONS

Elmer W. Brennan, Carpentersville, Ill., assignor to The Pure Oil Company, Chicago, Ill., a corporation of Ohio No Drawing. Application October 27, 1950, Serial No. 192,631

13 Claims. (Cl. 252—33.6)

This invention relates to lubricating oil compositions containing certain valuable addends, and more particularly, it relates to addends for mineral lubricating oil and cutting oil compositions comprising high molecular weight condensation products capable of improving the properties of the lubricating oils, cutting oils, and other oils.

Lubricants bearing sulfur, or lubricants containing addition agents comprising sulfur compounds, or condensation products of sulfur compounds are known to the art. Sulfurized or sulfur-bearing lubricants have long been used for the improvement of cutting oils, but they display one disadvantage, that is, they become very viscous after a short period of use, darken considerably in color, and tend to sludge. It is highly desirable to attain in such lubricating compositions a high film strength, high heat capacity, no tendency to sludge or oxidize, and a maximum of protection for bearing surfaces with freedom from varnish formation. The present invention makes possible the elimination of the foregoing disadvantages in lubricating compositions.

This invention has particular utility in improving the lubricating properties of lubricating oils and the prevention of the corrosion of alloy bearings such as copper-lead, cadmium-silver, and cadmium-nickel. Alloy bearings of these types are used almost exclusively in the modern high-compression, internal combustion engine and their protection under conditions of high bearing pressure, high speeds and temperatures, has been a difficult problem.

Accordingly, it is one object of this invention to provide a method for preparing new sulfur-containing addends for lubricating compositions. A further object of this invention is to provide improved lubricating compositions, which contain sulfur-bearing addends, which exhibit oxidation and corrosion inhibition properties. Still another object of this invention is to provide a new composition of matter which includes the condensation products described herein. Other objects and advantages of this invention will become apparent as the description thereof proceeds.

Broadly, this invention comprises a new composition of matter produced by the condensation reaction of a halogenated ester or a halogenated metallic salt of an organic acid, or a halogenated organic acid, and an aromatic polysulfide in the presence of a catalyst.

The general formula for compounds prepared in accordance with one aspect of this invention may be represented as:

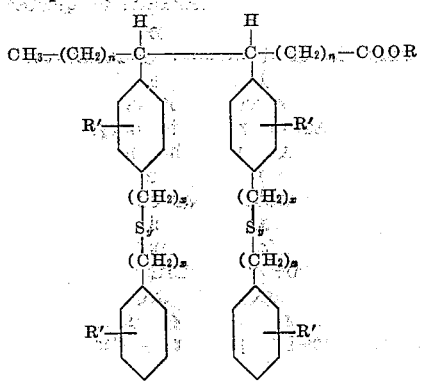

where R is any alkyl group, or hydrogen, or a metal of the alkaline or alkaline earth series, R' is any primary, secondary, or tertiary alkyl radical, $n$ equals 2 to 7, $x$ equals 0 to 4, and $y$ equals 1 or more.

The product obtained by the present condensation reaction is dependent upon the proportions of ester and sulfur compound used. Therefore, it is possible to adjust the proportions so that compounds of the following formula may be obtained:

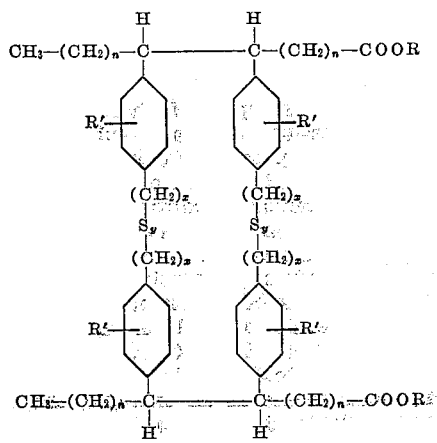

where R is any alkyl group, or hydrogen, or a metal of the alkaline or alkaline earth series, R' is any primary, secondary, or tertiary alkyl radical, $n$ equals 2 to 7, $x$ equals 0 to 4, and $y$ equals 1 or more.

The reactions which take place in the preparation of the compound, in accordance with this invention, are two-fold. The first reaction is for the preparation of the halogenated ester and the second reaction is the condensation itself. In addition to esters of unsaturated organic acids the metallic salts of unsaturated organic acids and the unsaturated organic acids themselves which are capable of halogenation may be used as starting materials. Those unsaturated organic acids having conjugated double bonds generally are not applicable to the reaction for the reason that they had a tendency to form polymers which degrade the end product. Also the presence of a triple bond in the unsaturation is not desirable for the same reason. Therefore unsaturated esters, salts and organic acids, are used which are readily halogenated without the danger of polymer formation. Any long chain carboxyl containing organic compound which may be halogenated at adjacent carbon atoms in the chain may be used in the condensation reaction with the aromatic polysulfide to yield valuable addends in accordance with the invention. As typical organic esters which may be used methyl dodecanate, ethyl dodecanate, propyl dodecanate, ethyl palmitate, butyl palmitate, propyl palmitate, methyl oleate, methyl palmitate, ethyl oleate, octyl dodecanate and methyl octanate may be noted. Also the alkyl esters of the unsaturated fatty acids of higher molecular weight, for example, esters of ricinoleic acid, petroselinic acid, vaccenic acid, gadoleic acid, cetoleic acid, erucic acid and selacholeic acid may be used. The sodium, potassium, lithium, rubidium, caesium, strontium, calcium or barium salts of the unsaturated fatty acids may be used in preparing the addends of the invention. Examples of these are sodium palmitate, potassium octanate, calcium oleate, barium oleate and potassium palmitate.

The halogenation is conducted by reacting approximately equimolar quantities of the unsaturated ester salt or acid and a halogen to form the halogenated derivative. The reaction is conducted in the ordinary way using standard conditions whereby a substitution of halogen atoms in the new molecule takes place. The temperatures range from 50° F. to 300° F., with pressures from atmospheric to 30 p. s. i.

Using methyloleate as an example, the reaction may be depicted as follows:

$C_{17}H_{33}COOCH_3 + Br_2 \longrightarrow$

Methyloleate   bromine

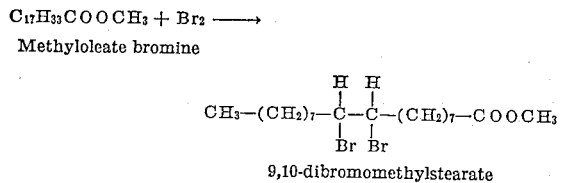

9,10-dibromomethylstearate

Yields of approximately 90% of the halogenated ester are obtained.

The halogenated ester so produced is next reacted with a stoichiometric excess of an aromatic polysulfur compound, which has a labile hydrogen atom somewhere in the aromatic ring. Any aromatic sulfur compound complying with this general description will work in the present reaction. A typical compound of this type is dibenzyl disulfide. Other examples are dibenzyl monosulfide, diphenyl disulfide and alkyl substituted dibenzyl disulfides and polysulfides, such as di-m-isobutyl phenyl ethyl disulfide and di-m-methyl phenyl trisulfide. The reaction may be carried out in the presence of a Friedel-Crafts type catalyst by heating under reflux conditions for several hours. A catalyst which has been found to facilitate the reaction is aluminum chloride. However, the other Friedel-Crafts type catalysts may also be used to promote the reaction. The reactants are dissolved in a suitable solvent, such as carbon disulfide, and then treated with the catalysts under the reflux conditions. This brings about intimate contact of reactants with catalyst and shortens the time of reaction. The temperature of the refluxing process will depend on the type of solvent used. With carbon disulfide as the solvent the temperature of refluxing will be above about 114° F. The reaction is conducted under atmospheric conditions although superatmospheric pressures may be used.

Continuing with the 9,10-dibromomethylstearate prepared from methyloleate as an example of the present invention, its reaction with dibenzyl disulfide may be represented as:

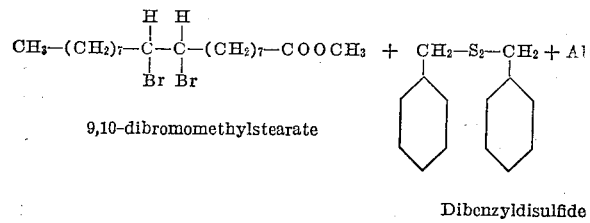

Dibenzyldisulfide

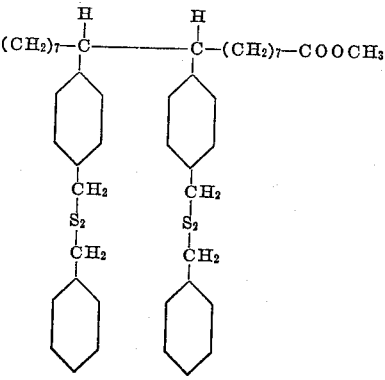

9,10-di-(dibenzyldisulfide)-methylstearate

The above described reaction is complete after about 8 hours of refluxing at 120° F. The carbon disulfide solvent is removed by evaporation on a steam bath and the aluminum chloride catalyst destroyed in the process by adding water. The product is removed from the reaction mass by extraction with a suitable solvent as, for example, ether. The product 9,10-di-(dibenzyl disulfide)-methylstearate is a reddish liquid of light viscosity and upon analysis, is found to have a sulfur content of about 15.9%.

The condensation products which may be prepared in accordance with this invention are numerous since a wide variety of unsaturated esters, acids and salts along with several aromatic sulfide and polysulfide compounds are reactable to form the products herein disclosed. Therefore no advantage is seen in listing all of the various compounds which come within the scope of the invention and only a few illustrative examples are therefore given:

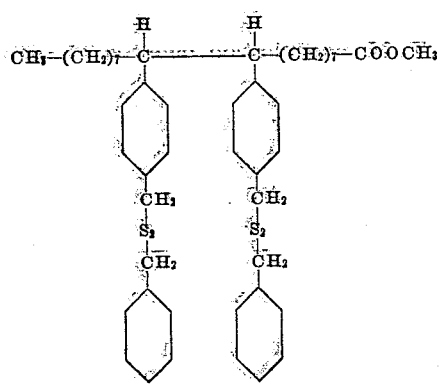

9,10-di-(dibenzyldisulfide)-methylstearate

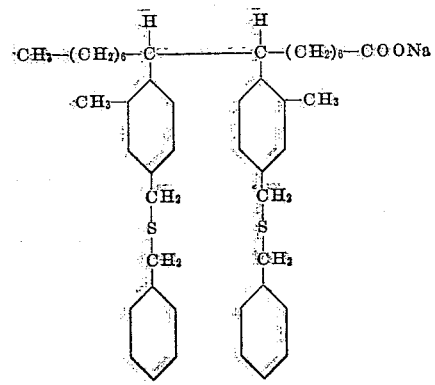

8,9-di-(m-methylbenzyl benzylsulfide)-sodiumpalmitate

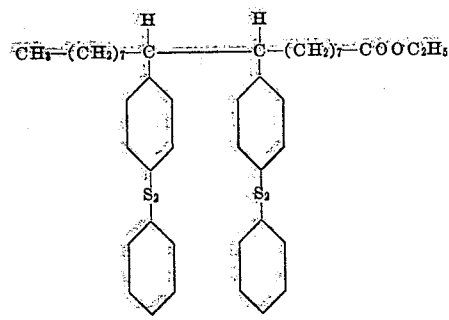

9,10-di-(diphenyldisulfide)-ethylstearate

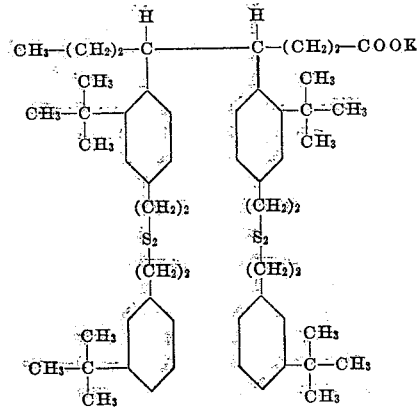

4,5-di-(di-m-isobutyl phenylethyl disulfide)-potassium octanate

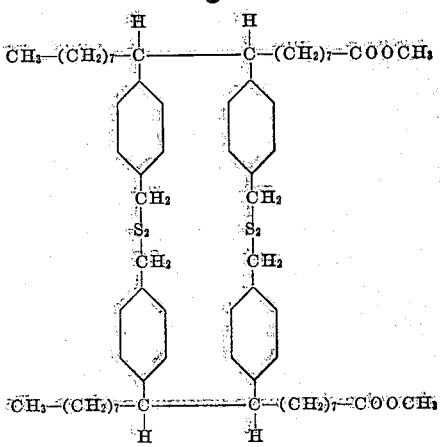

9,10,9',10'-di-(dibenzyldisulfide)-di-(methylstearate)

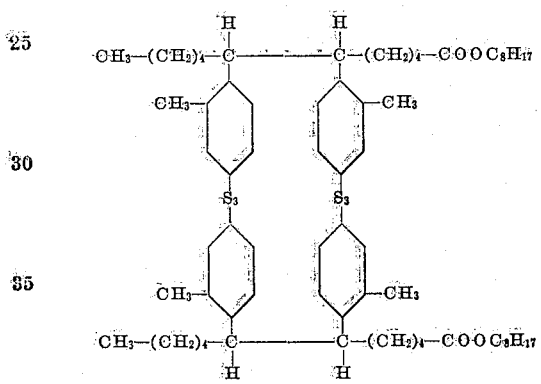

6,7,6',7'-di-(di-m-methylphenyl trisulfide)-di-(octyl dodecanate)

In order to demonstrate the preparation of a typical condensation product prepared in accordance with this invention, the following example is given. This example is to be construed as merely illustrative of the mode of preparation and it is within the skill of the art to vary the reactants and conditions in a manner which will yield derivatives of the disclosed addends and variations thereon. As has been demonstrated, variance in the choice of reactants, unsaturated ester and aromatic sulfide, will change the end product depending on the requirements desired in the compounded lubricant. If it is desired to increase the oil solubility a carboxylic acid having a long carbon chain may be used or in addition the size of the alkyl groups substituted on the aromatic ring of the aromatic polysulfide may be increased. If it is desired to increase the oxidation inhibition of the final product an aromatic sulfide may be used in the condensation which has 2 or more sulfur atoms to the molecule. Additional sulfur may be readily incorporated into an aromatic disulfide, for example, by treatment with elemental sulfur at 300° F. under atmospheric pressure.

*Example 1.*—0.25 gram mole of methyl oleate was reacted with 0.25 gram mole of bromine at ambient temperature to form 9,10-dibromomethylstearate. This product was then mixed with 0.5 gram mole of dibenzy disulfide, 0.66 gram mole of aluminum chloride and 400 cc. of carbon disulfide and the mixture heated at about 120° F. for eight hours under reflux conditions. The carbon disulfide was removed by evaporation in a steam bath, and the aluminum chloride complex was destroyed in the process by adding $H_2O$. The 9,10-di-(dibenzyl disulfide)-methyl stearate so produced was then extracted with ether to yield a reddish liquid of light viscosity. Purity of the 9,10-di-(dibenzyl disulfide)-methyl stearate based on sulfur content was 97.6%.

A series of modified Underwood tests were made in order to further demonstrate the effectiveness of compounds falling within the scope of the present invention in inhibiting the oxidation of mineral lubricating oils and inhibiting bearing corrosion of automotive engine bearings. In one test, a Mid-Continent solvent refined SAE 30 lubricating oil was tested with no additive present. This test is indicated as the blank oil. In another test, 9,10-di-(dibenzyl disulfide-methylstearate, a typical example of a compound coming within the scope of the present invention, was blended with Mid-Continent solvent refined SAE 30 lubricating oil in amount of 0.85% by weight. This is equivalent to 0.135% by weight of added sulfur. Tests were also conducted using an amount of dibenzyldisulfide equivalent to from 0.036 to 0.15% by weight of added sulfur in a Mid-Continent solvent refined SAE 30 lubricating oil. All tests were conducted in the presence of 0.12% by weight of iron naphthenate as a catalyst to accelerate the test. This is in conformance with the standard procedure described in an article entitled "Automotive Bearing Materials and Their Application" by A. F. Underwood, Journal of Society of Automotive Engineers, vol. 43, pages 385–392, September 1938. Each of the tests were conducted with the oil at a temperature of 275° F., a pressure of 15 p. s. i. within the machine, and using standard Chevrolet bearings composed of copper-lead alloy set on a steel backing, as is recommended by the Coordinating Research Council Procedures on L–4 and FL–2 tests. It is usual to continue bearing corrosion tests for a period of about 20 hours on uninhibited oils and for longer periods up to about 40 hours for inhibited oils. The tests on dibenzyl disulfide were stopped after the number of hours shown because of excessive bearing weight loss. The bearings are weighed before and after testing and the weight loss or gain is expressed in either grams of total bearing weight or in weight per cent. The results are shown in the following table:

TABLE I

*Bearing corrosion tests at 275° F.*

| Additive | Percent additive | Percent S from additive | Hours | Percent weight loss of bearings | Acid number | Percent solids | Percent viscosity increase |
|---|---|---|---|---|---|---|---|
| Blank oil | | | 36 | 0.095 | 1.23 | 0.90 | 45 |
| 9,10-di-(dibenzyl-disulfide)-methyl-stearate | 0.85 | 0.135 | 36 | 0.001 | 1.12 | 0.3 | 12 |
| Dibenzyl disulfide | 0.58 | 0.150 | [1]15 | 0.36 | 0.30 | 9.5 | −17 |
| Do | 0.29 | 0.076 | [1]10 | 0.33 | 0.39 | 6.0 | −6 |
| Do | 0.14 | 0.036 | [1]10 | 0.31 | 0.39 | 9.8 | −5 |

[1] Tests stopped before 36 hours because of excessive bearing weight loss.

In Table I, the acid number was determined in accordance with the standard method D188–27T (A. S. T. M.), the "Per cent solids" was determined by placing 3 grams of the used oil after each test in an Erlenmeyer flask with 100 cc. of A. S. T. M. precipitation naphtha of the type specified in A. S. T. M. method D91–25. The oil and naphtha are thoroughly mixed and allowed to stand for three hours. The insoluble matter, then filtered in a Tared Gooch crucible previously prepared with an asphalt pad 1 inch thick and dried in 300° F. for 30 minutes. The insoluble residue is washed with 100 cc. of A. S. T. M. naphtha and dried in an oven at 300° F. for 30 minutes, cooled, and weighed. The increase in weight is the naphtha insoluble portion.

The weighed naphtha insoluble residue is extracted with successive portions of chloroform poured through the filter pad using light suction. The extraction should be continued until the filtrate is colorless and for this purpose, 100 cc. of chloroform is generally sufficient. With heavy naphtha insoluble residues, the chloroform is allowed to stand in the crucible with suction for a few minutes before each portion of the chloroform is drawn through the crucible. The residue is then dried at 300° F. for 30 minutes in an oven, cooled, and weighed. The loss in weight is the chloroform soluble.

If the filtrate from these filtrations is not clear, due to the presence of detergents, the standard practice is to refilter through a second Gooch filter and report the deposits from both crucibles as the per cent solids.

For a great many uses, compounded industrial oils are required to pass the A. S. T. M. turbine oil oxidation test. This test involves passing oxygen through a sample of the test oil maintained at 200 to 300° F. in the presence of water, with iron or copper catalysts. An acceptable oil is one, the neutralization number of which does not exceed 0.25 after 1,000 hours of test. This oxidation test, in a modified form, is applicable to lubricating oil compositions and is particularly suitable in determining the rate of oxidation inhibition of additives. Such oxidation absorption tests were conducted on base oils without an additive and base oils with 9,10-di-(dibenzyl disulfide)-methylstearate, diphenyl disulfide, and dibenzyl disulfide incorporated therein. Tests were made using the modified Davis method at 300° F. with 0.1 gram of copper per cc. of oil being tested. The copper is included as a catalyst to accelerate the test. The procedure is based on the method described in "Industrial and Engineering Chemistry," volume 33, page 339, 1941. In the test, a 10 gram sample of the oil is placed in a Sligh flask which is then filled with oxygen, connected to a U-tube manometer and then placed in a constant temperature bath maintained at various selected temperatures. As the oxygen is absorbed by the sample, the pressure decreases in the flask and it is recorded at frequent intervals until it has dropped 60 mm. of mercury—the practical limit of the apparatus. The average rate of absorption of oxygen in cc. per minute is also recorded. Both the time required for the pressure drop of of 60 mm. of mercury and the average rate of absorption of oxygen may be taken as an indication of the stability of the sample. The results are shown in Table II:

TABLE II

*Davis oxygen absorption tests*

| Sample | Percent viscosity increase at 100° F. | Acid number | | Time (minutes) | Rate of absorption cc./minute |
|---|---|---|---|---|---|
| | | Before | After | | |
| Base oil, SAE10/10W | 10 | 0.11 | 2.00 | 1,065 | 0.47 |
| Base oil, SAE30 MCSR | 14.4 | 0.05 | 1.70 | 1,184 | 0.42 |
| Base oil, SAE30 MCSR + 0.85 weight percent 9,10-di-(dibenzyldisulfide)-methylstearate | 8.8 | 0.04 | 1.00 | 3,035 | 0.084 |
| Base oil, SAE10/10W + 0.72 weight percent diphenyl disulfide | 8.0 | 0.11 | 1.9 | 570 | 0.88 |
| Base oil, SAE10/10W + 0.62 weight percent dibenzyl disulfide | 10 | 0.11 | 1.7 | 1,280 | 0.39 |

Two different base oils are used in Table II—namely, SAE10/10W and SAE30. However, both are Mid-Continent solvent refined oils and their blank runs indicate that they have comparable rates of absorption of oxygen. Therefore, any changes indicated by the addition of additives will be due to the additive alone.

Additional bearing corrosion tests have indicated that after 40 hours, with an oil temperature of 225° F., of constant running with a Mid-Continent solvent refined SAE30 oil containing 0.85 weight per cent of 9,10-di-(dibenzyl disulfide)-methyl stearate, equivalent to 0.15 weight per cent of sulfur, the copper-lead alloy Chevrolet bearings displayed a black coating. This coating flaked off the bearings after five days standing under room conditions. The inside of the bearing corrosion test machine displayed only a light varnish. The bearing loss in grams per whole bearing was 0.004 gram. An uninhibited SAE30 Mid-Continent solvent refined oil, run under the same temperature conditions, showed a bearing loss of 1.2143 grams per whole bearing for only a 16 hour test, a badly corroded bearing surface, and heavy varnish deposits in the machine. The 9,10-di-(dibenzyl disulfide)-methyl-stearate considerably improved the oxidation and bearing corrosion qualities of the lubricating oil.

As is apparent from these bearing corrosion tests and oxygen absorption tests, the addends of the present invention are superior to ordinary disulfide inhibitors. The addition of the ester molecule to the dibenzyl disulfide or other aromatic polysulfide has the effect of increasing the film strength and wetting ability of the additive and has the added effect of enhancing the ability of the sulfur portion of the molecule to inhibit oxidation. However, the invention is not to be limited by any theories which would explain the unexpected increase in desirable qualities obtained.

As has been disclosed, the addends of the present invention may be incorporated in a viscous mineral oil or fractions thereof. However, the invention is not to be limited by the use of mineral oils alone in compounding. The term "mineral oil," as used herein, includes all mineral oil fractions which are useful for lubricating purposes. The blending of the condensation products herein disclosed with a lubricant yields a final composition which is free from haze and has the necessary physical characteristics to a saleable product. The beneficial action of the addends of this invention is not to be limited to their use with any particular kind of oil. Comparable results can be obtained with mildly refined oils as well as those which have been more highly refined. Both naphthenic and paraffinic base oils or their mixtures may be used for blending purposes. Also, other additives, such as pour point depressants, viscosity index improvers, detergents, color stabilizers, oiliness agents, extreme pressure agents and thickeners may be blended in the final product.

The addends which have been found to impart excellent anti-oxidant or anti-corrosive properties to mineral lubricating oil may be blended therewith in proportions from 0.1 to 5.0% by weight. These proportions vary with the particular type of mineral oil used and the purpose for which it is intended. If the blended mineral lubricating oil composition containing addends of the present invention is intended for severe use, i. e. at high bearing pressure and temperature, it is recommended that amounts of addend be incorporated to give an equivalent of from 0.025 to 0.2 weight per cent of sulfur therein from the additive. The proportions of additive preferred are between 0.5 to 5.0% by weight incorporated in a lubricating oil.

While the invention has been described with reference to various preferred forms and with reference to specific examples, it will be understood that the invention is not limited to these preferred forms or specific examples but may be practiced by various methods within the scope of the claims following.

What is claimed is:

1. A new composition of matter comprising a compound of the formula

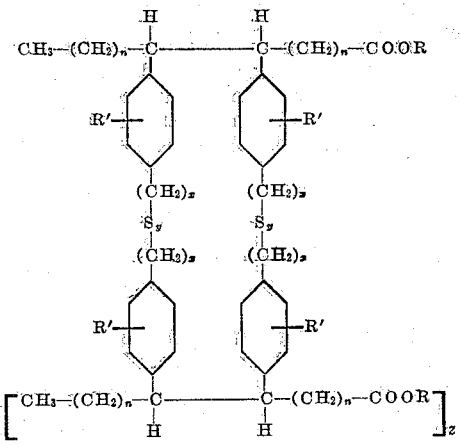

in which R is a radical selected from the group consisting of an alkyl group, hydrogen, a metal of the alkali series and a metal of the alkali earth series, R' is an alkyl radical selected from the group consisting of primary, secondary and tertiary alkyl radicals, $n$ is an integer of from 2 to 7, $x$ is an integer from 0 to 4, $y$ is an integer of at least 1, and $z$ is an integer of 0 to 1.

2. A new composition of matter comprising 9,10-di-(dibenzyldisulfide)-alkyl stearate.

3. A new composition of matter comprising 9,10,9',10'-di-(dibenzyldisulfide)-di-(alkyl stearate).

4. A new composition of matter comprising 9,10-di-(dibenzyldisulfide)-methyl stearate.

5. A new composition of matter comprising the metal salt selected from the group consisting of alkali and alkali earth metals, of 8,9-di-(m-alkyl benzyl benzylsulfide)-palmitate.

6. A new composition of matter comprising the metal salt selected from the group consisting of alkali and alkali earth metals of 4,5-di-(di-m-alkylphenyl ethyldisulfide)-octanate.

7. A lubricating composition comprising a mineral lubricating oil having incorporated therein, in an amount sufficient to exhibit bearing corrosion, an oil-soluble compound of the formula

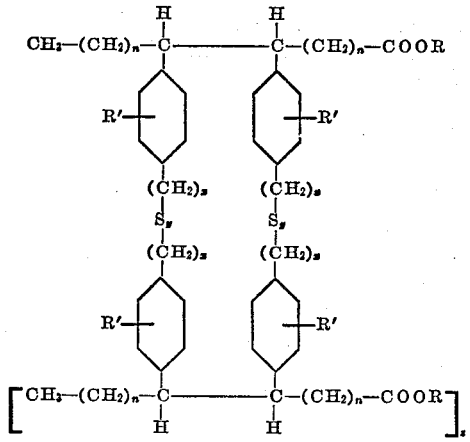

wherein R is a radical selected from the group consisting of an alkyl group, hydrogen, a metal of the alkali series and a metal of the alkali earth series, R' is an alkyl radical selected from the group consisting of primary, secondary and tertiary alkyl radicals, $n$ is an integer of 2 to 7, $x$ is an integer of 0 to 4, $y$ is an integer of at least 1 and $z$ is an integer of 0 to 1.

8. A lubricating composition comprising mineral lubricating oil and a small amount, sufficient to inhibit oxidation and bearing corrosion, of said oil, of 9,10-di-(dibenzyl disulfide)-alkyl stearate.

9. A lubricating composition comprising mineral lubricating oil and a small amount, sufficient to inhibit oxidation and bearing corrosion of said oil, of 9,10,9',10'-di-(dibenzyl disulfide)-di-(alkyl stearate).

10. A lubricating composition comprising mineral lubricating oil and a small amount, sufficient to inhibit oxidation and bearing corrosion of said oil, of 9,10-di-(dibenzyl disulfide)-methyl stearate.

11. A lubricating composition comprising mineral lubricating oil and a small amount, sufficient to inhibit oxidation and bearing corrosion of said oil, of a metal salt selected from the group consisting of alkali and alkali earth metals, of 8,9-di-(m-alkylbenzyl benzylsulfide)-palmitate.

12. A lubricating composition comprising mineral lubricating oil and a small amount sufficient to inhibit oxidation and bearing corrosion of said oil, of a metal salt, selected from the group consisting of alkali and alkali earth metals, of 4,5-di-(di-m-alkylphenyl ethyldisulfide)-octanate.

13. A new composition of matter comprising compounds selected from the group having formulas consisting of

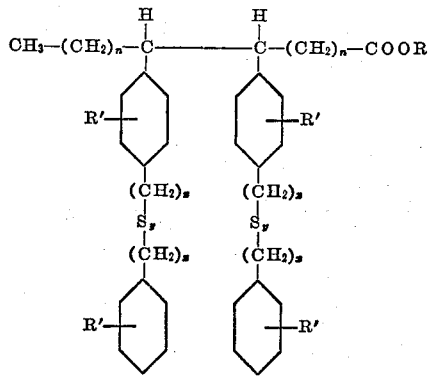

and

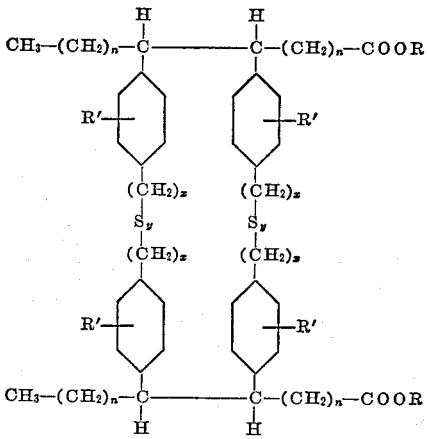

wherein R is a radical selected from the group consisting of an alkyl group, hydrogen, a metal of the alkali series and a metal of the alkali earth series, R' is an alkyl radical selected from the group consisting of primary, secondary, and tertiary alkyl radicals, $n$ is an integer of from 2 to 7, $x$ is an integer of from 0 to 4 and $y$ is an integer of at least 1.

ELMER W. BRENNAN.

References Cited in the file of this patent

UNITED STATES PATENTS

| Number | Name | Date |
|---|---|---|
| 2,257,752 | Lincoln | Oct. 7, 1941 |
| 2,319,189 | Reiff | May 11, 1943 |
| 2,385,301 | Reiff | Sept. 18, 1945 |
| 2,476,166 | Wayo | July 12, 1949 |
| 2,542,831 | Oberright | Feb. 20, 1951 |
| 2,542,832 | Oberright | Feb. 20, 1951 |